(12) United States Patent
Kalyanasundaram et al.

(10) Patent No.: US 11,408,526 B2
(45) Date of Patent: Aug. 9, 2022

(54) PILOT-OPERATED RELIEF VALVE ASSEMBLY

(71) Applicant: Emerson Automation Solutions Final Control US LP, Stafford, TX (US)

(72) Inventors: Vishwa Kalyanasundaram, Stafford, TX (US); Michael Mcneely, Katy, TX (US); Raul Almazan, The Woodlands, TX (US); William Bockeloh, Houston, TX (US)

(73) Assignee: Emerson Automation Solutions Final Control US LP, Stafford, TX (US)

( * ) Notice: Subject to any disclaimer, the term of this patent is extended or adjusted under 35 U.S.C. 154(b) by 380 days.

(21) Appl. No.: 16/588,850

(22) Filed: Sep. 30, 2019

(65) Prior Publication Data

US 2020/0103042 A1    Apr. 2, 2020

Related U.S. Application Data

(60) Provisional application No. 62/738,064, filed on Sep. 28, 2018.

(51) Int. Cl.
| | |
|---|---|
| *F16K 17/10* | (2006.01) |
| *F16K 37/00* | (2006.01) |
| *F16K 17/02* | (2006.01) |
| *G01F 1/36* | (2006.01) |
| *F16K 31/363* | (2006.01) |
| *G01F 1/40* | (2006.01) |
| *G01F 1/38* | (2006.01) |

(52) U.S. Cl.
CPC .............. *F16K 17/10* (2013.01); *F16K 17/02* (2013.01); *F16K 31/363* (2013.01); *F16K 37/005* (2013.01); *F16K 37/0041* (2013.01); *F16K 37/0083* (2013.01); *G01F 1/36* (2013.01); *G01F 1/363* (2013.01); *G01F 1/383* (2013.01); *G01F 1/40* (2013.01); *F17C 2205/0332* (2013.01)

(58) Field of Classification Search
CPC .... F16K 17/10; F16K 31/363; F16K 37/0041; F16K 37/0083; F16K 37/005; F17C 2205/0332; G01F 1/40; G01F 1/36; G01F 1/363; G01F 1/383
See application file for complete search history.

(56) References Cited

U.S. PATENT DOCUMENTS

| | | | |
|---|---|---|---|
| 4,390,041 A * | 6/1983 | Reip | ................... F16K 17/105 137/102 |
| 4,705,065 A | 11/1987 | McNeely et al. | |
| 4,957,136 A | 9/1990 | Gavrila | |
| 5,365,795 A | 11/1994 | Brower, Jr. | |
| 5,899,962 A | 5/1999 | Louwagie et al. | |

(Continued)

OTHER PUBLICATIONS

Emerson; Anderson Greenwood Series 90/9000 Pilot Operated Pressure Relief Valves technical data; 56 pages.

(Continued)

*Primary Examiner* — Atif H Chaudry
(74) *Attorney, Agent, or Firm* — Quarles & Brady LLP

(57) ABSTRACT

A pilot-operated relief valve assembly can include a relief valve, and a pressure detection assembly. A valve lift factor or indicator of relief flow can be determined based on pressure measurements gathered by the pressure detection assembly.

20 Claims, 11 Drawing Sheets

(56) References Cited

U.S. PATENT DOCUMENTS

| | | | |
|---|---|---|---|
| 5,992,449 A * | 11/1999 | Sprague | F16K 17/10 137/488 |
| 6,209,577 B1 * | 4/2001 | Lai | G05D 16/166 137/489 |
| 6,216,726 B1 | 4/2001 | Brown et al. | |
| 6,283,138 B1 | 9/2001 | Friend et al. | |
| 6,654,697 B1 | 11/2003 | Eryurek et al. | |
| 7,110,878 B2 | 9/2006 | Nakamura et al. | |
| 8,000,909 B2 * | 8/2011 | Danzy | G01F 1/74 702/50 |
| 8,958,996 B2 | 2/2015 | Danzy | |
| 2003/0098070 A1 * | 5/2003 | Lehnst | G05D 16/2013 137/487.5 |
| 2010/0168927 A1 | 6/2010 | Burrows | |
| 2011/0240128 A1 | 10/2011 | Barbato et al. | |
| 2011/0240146 A1 | 10/2011 | Kawasaki et al. | |
| 2011/0307191 A1 * | 12/2011 | Lafleur | G01M 3/2876 702/47 |

OTHER PUBLICATIONS

Emerson: Anderson Greenwood Series 200/400/500/700/800 Pilot Operated Relief Valves technical data; 64 pages.

Curtiss-Wright Valve Group; Series 2600 Pressure Relief Valves technical data; Copyright 2015 Farris Engineering; 96 pages.

Hydroseal Series 3500 Pilot Operated Relief Valves technical data; Copyright 2009 CIRCOR Energy Products, Inc.; 8 pages.

Type 63EG-98HM Pilot-Operated Relief Valve or Backpressure Regulator technical data; Bulletin 71.4:63EG-98HM; Sep. 2015;Copyright Emerson Process Management Regulator Technologies, Inc. 2000.2015; 8 pages.

Enardo 850/950 Series with Smart Wireless technology flier; obtained from <https://www.emerson.com/en-US/catalog/enardo-series-950> Dec. 4, 2019; Copyright 2016 Emerson Process Management Regulator technologies, Inc.; 2 pages.

* cited by examiner

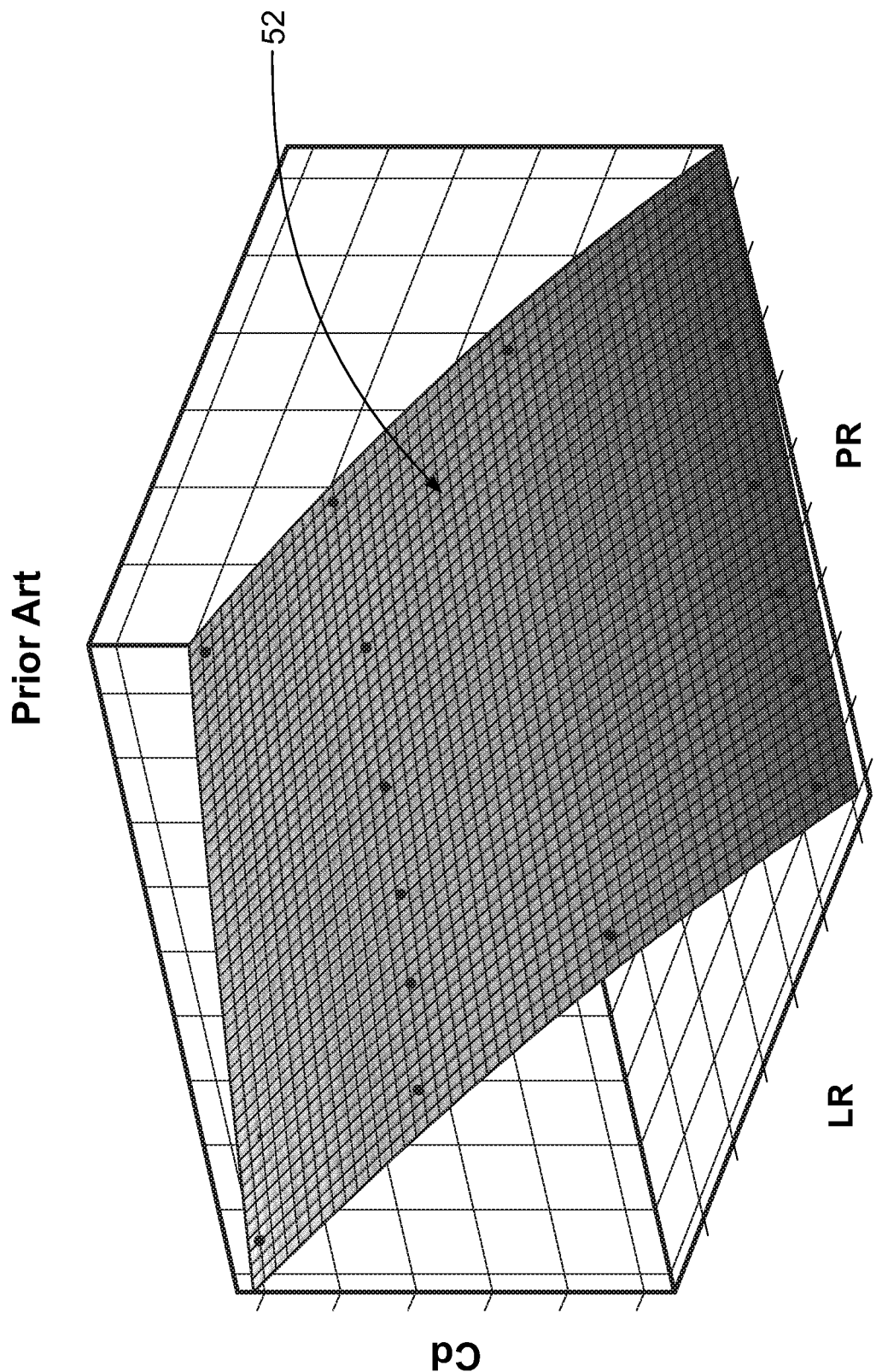

PILOT-OPERATED RELIEF VALVE ASSEMBLY

BACKGROUND

Pilot-operated relief valves can be used in a variety of industrial, commercial, and other settings to relieve pressure from a system. In some applications, it may be useful to monitor the volume or flow of fluids relieved from a pilot-operated relief valve when the valve is actuated during an overpressure event. For example, the volume or flow rate of fluids vented through a relief valve is sometimes used to determine compliance with environmental and safety regulations.

SUMMARY

Some embodiments of the invention provide a pilot-operated relief valve assembly that can include a pilot valve, a main valve, a pressure detection assembly, and a control system. The relief valve can include a dome in fluid communication with the pilot valve, a valve inlet in fluid communication with the pilot valve, and a valve outlet. The main valve can be configured to permit or prevent flow from the valve inlet to the valve outlet based on a pressure differential between an inlet pressure at the valve inlet and a dome pressure within the dome. The pressure detection assembly can be configured to determine at least one of: a run-time dome pressure within the dome, a run-time inlet pressure at the valve inlet, or a run-time pressure differential between the valve inlet and the dome. The control system can be configured to communicate with one or more processor devices to determine, based on the at least one of the run-time dome pressure, the run-time inlet pressure, or the run-time pressure differential, a run-time pressure factor. The control system can also be configured to determine a run-time valve lift factor based upon the run-time pressure factor, without directly measuring a run-time valve lift of the main valve.

Some embodiments of the invention provide a method of monitoring a pilot-operated relief valve assembly that includes a pressure detection assembly, a pilot valve, and a main valve that includes a dome in fluid communication with the pilot valve, a valve inlet in fluid communication with the pilot valve, a valve outlet, and a piston that is configured to permit flow from the valve inlet to the valve outlet in response to a difference between an inlet pressure at the valve inlet and a dome pressure within the dome. The method can include determining, based on one or more measurements by the pressure detection assembly, at least one of: a run-time dome pressure at the dome, a run-time inlet pressure at the valve inlet, or a run-time pressure differential between the valve inlet and the dome. The method can also include determining a run-time pressure factor based on the determined at least one of the run-time dome pressure, the run-time inlet pressure, or the run-time pressure differential. The method can further include, without measuring run-time displacement of the piston, determining a run-time valve flow factor for the main valve based upon one or more of correlating the run-time pressure factor directly to the run-time valve flow factor or determining a run-time valve lift factor based upon the run-time pressure factor and determining the run-time valve flow factor based on the run-time valve lift factor.

Some embodiments of the invention provide a control system for a pilot-operated relief valve assembly, the pilot-operated relief valve assembly. The control system can include a relief valve assembly and one or more pressure sensors. The relief valve assembly can include a pilot valve and a main valve, the main valve having a dome in fluid communication with the pilot valve, a valve inlet in fluid communication with the pilot valve, a valve outlet, and a piston. The piston can be movable between a fully open position and a fully closed position, and be caused to move between the fully open and fully closed positions by a pressure differential between the dome and the valve outlet. The main valve can be configured to permit flow from the valve inlet to the valve outlet in response to an inlet pressure at the valve inlet, depending on a position of the piston. The control system can also include one or more processor devices that are configured to determine a run-time pressure factor at a run-time valve lift of the main valve, based on the determined at least one of the run-time dome pressure, the run-time inlet pressure, or the run-time pressure differential; and based upon the run-time pressure factor and without receiving a measurement of the run-time valve lift, determine a run-time valve flow factor at the run-time valve lift, wherein the run-time valve flow factor corresponds to run-time flow from the valve inlet to the valve outlet of the main valve.

Some embodiments provide a method for monitoring a pilot-operated relief valve assembly that includes a pressure detection assembly, a pilot valve, and a main valve that includes a dome in fluid communication with the pilot valve, a valve inlet in fluid communication with the pilot valve, a valve outlet, and a piston that is configured to permit flow from the valve inlet to the valve outlet in response to a difference between an inlet pressure at the valve inlet and a dome pressure within the dome. The method can include providing a relationship for a run-time valve flow factor for the main valve. Without a measurement of run-time displacement of the piston, the relationship is configured to control a processor device to one or more of correlate a run-time pressure factor directly to the run-time valve flow factor, or correlate a run-time valve lift factor to the run-time valve flow factor, wherein the run-time valve lift factor is determined based upon the run-time pressure factor. The run-time pressure factor can be configured to be determined based on at least one of a run-time dome pressure at the dome, a run-time inlet pressure at the valve inlet, or a run-time pressure differential between the valve inlet and the dome, each of which is configured to be determined based on one or more measurements by the pressure detection assembly.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 2C is a graph of measured discharge coefficients, pressure reductions, and valve lift ratios of the pilot relief valve of FIGS. 2A and 2B;

DETAILED DESCRIPTION

Figure 1A:
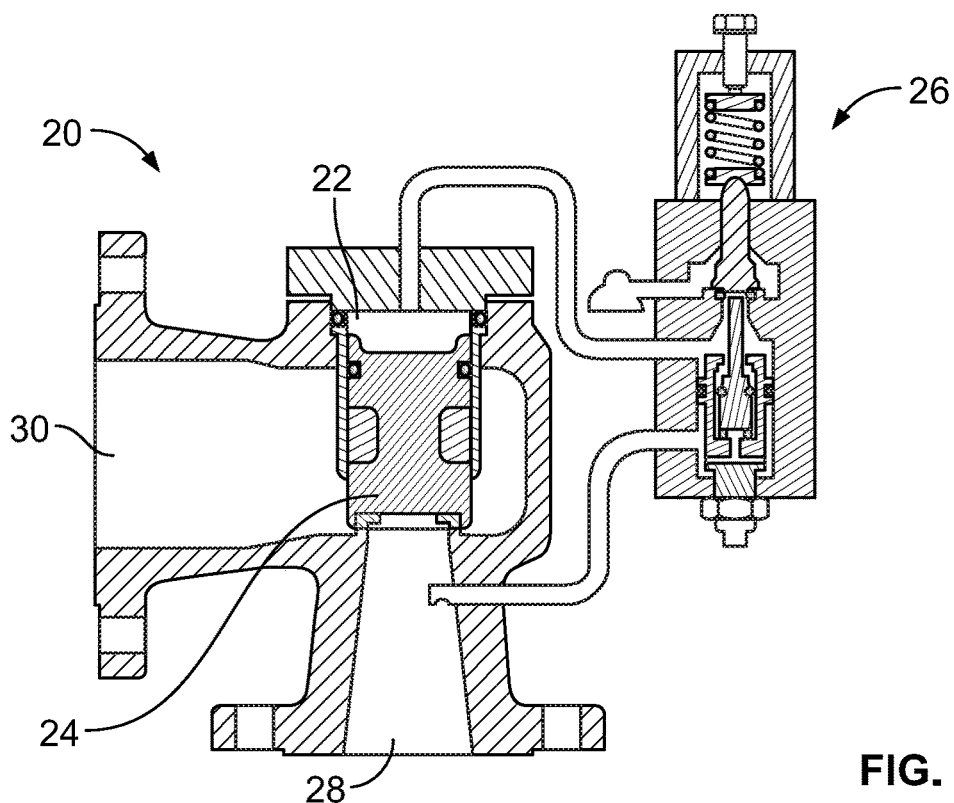
FIGS. 1A and 1B are schematic views of a conventional pilot relief valve.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

Embodiments of the invention can be implemented as systems and/or methods, including computer-implemented methods. Some embodiments of the invention can include (or utilize) a device such as an automation device, a special purpose or general purpose computer including various computer hardware, software, firmware, and so on, consistent with the discussion below.

In some embodiments, aspects of the invention, including computerized implementations of methods according to the invention, can be implemented as a system, method, apparatus, or article of manufacture using standard programming and/or engineering techniques to produce software, firmware, hardware, or any combination thereof to control a computer or processor-based device to implement aspects detailed herein. The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

As used herein in the context of computerized implementation of embodiments of the invention, unless otherwise specified or limited, the terms "module," "controller" and the like are intended to refer to part or all of a computer-related system that includes hardware, software, a combination of hardware and software, or software in execution. For example, a module may be, but is not limited to being, a processor device, a process running on a processor device, an object, an executable, a thread of execution, a program, and/or a computer. By way of illustration, both an application running on a computer and the computer can be a module. One or more modules (or controllers, and so on) may reside within a process and/or thread of execution, may be localized on one computer, distributed between two or more computers or processor devices, and/or included within another component (or system, module, and so on).

Certain operations of methods according to the invention, or of systems executing those methods, may be represented schematically in the FIGS. or otherwise described herein. Unless otherwise specified or limited, representation in the FIGS. or description herein of particular operations in particular order is not intended to require those operations to be executed in a particular order. Certain operations represented in the FIGS., or otherwise disclosed herein, can be executed in different orders, as appropriate for particular embodiments of the invention. Further, in some embodiments, certain operations can be executed in parallel, including by dedicated parallel processors, or separate computing devices configured to interoperate as part of a large system.

As noted above, relief valves can be used in a variety of industrial, commercial, and other applications to relieve fluid pressure from a system. In some applications, the flow capacity of a particular relief valve may need to be determined to determine the amount of fluid that is released from an associated system, such as may be required to assess compliance with environmental or safety regulations. But conventional methods for measuring the flow capacity of a relief valve can result in issues with inaccuracy or can involve intrusive or otherwise problematic retrofitting or other modification of sensor equipment. For example, some conventional methods simply calculate flow capacity based on the maximum rated lift of the relevant relief valve, effectively assuming that the relief valve is fully open whenever pressure is being relieved. However, particularly in applications with modulating pilot-operated relief valves, pressure can be relieved with a relief valve only partially opened, rather than at the maximum possible lift. Accordingly, the conventional "fully-open" assumption can result in an overestimation of fluid relief as compared to the actual amount of fluid that was relieved, which may result in increased fees or fines.

As another example, some conventional methods for measuring the flow capacity of a relief valve use a linear position transducer that directly measures displacement of a piston (also referred to generally as "piston lift" or "valve lift") during an overpressure event. However, use of a linear position transducer to measure piston lift can be intrusive or otherwise non-optimal. For example, for a relief valve that is already installed into a fluid system, use of a linear (or other) position transducer may require retrofitting of the valve. In some cases, this can detrimentally affect relief valve performance, or can introduce additional maintenance or certification requirements, or increased risk of relief valve failure.

Embodiments of the invention can address these and other issues. For example, some embodiments of the invention can provide an assembly, a control system, or a related method for determining valve lift or an associated flow capacity, without necessarily requiring a linear position transducer or other similar sensor arrangement. In this regard, for example, one or more measurements of pressure in a relief valve assembly can be taken by a pressure detection assembly (e.g., an arrangement of one or more pressure sensors of known types). The pressure measurements, or other data derived therefrom, can then be used to calculate a valve lift factor (e.g., a dimensionless measure of total valve lift) based upon a previously calibrated correlation. In some embodiments, this can allow for an estimation of relief valve flow capacity that is relatively accurate and that may not require the use of a retrofitted linear position transducer or other similar apparatus. Further, this approach and others disclosed herein, can be effectively implemented during run-time operations, with little to no disturbance thereof.

Embodiments of the invention can be implemented with regard to a variety of types and configurations of pilot-operated relief valves. For example, embodiments of the invention can be implemented with regard to high or low pressure pilot-operated relief valves of different types or sizes, or snap or modulating pilot-operated relief valves of different types or sizes, and other valves.

In some embodiments, different correlations may be applied depending on the relevant valve type, valve size, operating conditions (e.g., set pressure), or other factors. In this regard, for example, a calibration process can be used to establish an appropriate correlation for each of one or more valves (or valve types) at a variety of operating conditions. For example, a correlation between a lift factor and a pressure factor can be predetermined for a particular pilot-operated relief valve at a variety of operating conditions (e.g., at a variety of pilot-valve set pressures for each valve). During run-time operation of a corresponding valve, an appropriate one (or more) of the correlations can then be used to determine an estimated run-time valve lift factor, or other relevant parameter (e.g., run-time discharge coefficient or other run-time valve flow factor), based upon run-time pressure measurements. Indeed, in some embodiments, run-time valve lift or flow factors can be determined based solely on pressure measurements, in contrast to more complicated conventional approaches.

In some embodiments, multiple respective correlations, such as correlations between a lift factor and a pressure factor, can be predetermined for a plurality of types of pilot-operated relief valves. For example, a series of measurements of piston lift, dome pressure, and valve inlet pressure (or dome-inlet pressure differential) can be obtained for each relevant valve during a series of overpressure events at a plurality of predetermined set pressures. Based upon the obtained data, correlations for each of the valves across a variety of operating conditions can be determined, to be later applied during corresponding run-time operations.

In some embodiments, correlations can be stored in a remote or local database to be accessed during run-time operations. For example, relevant correlations can be stored on a local control at a relevant valve or can be stored remotely for access by a wired or wireless connected valve during run-time. In some embodiments, run-time pressure measurements can be stored temporarily (e.g., locally at a valve or associated controller) and then later retrieved for retrospective calculation of run-time parameters for a past event.

In some embodiments, use of a predetermined correlation, such as discussed above, can allow for an estimated run-time valve lift factor to be determined based upon relatively simple run-time pressure measurements and, in some cases, not requiring any run-time measurements other than pressure measurements. For example, run-time dome and inlet pressures (or associated pressure differentials) can be measured for a particular pilot-operated relief valve, and an associated local or remote controller can then determine an associated piston lift based on the relevant correlation(s). This approach can, for example, allow operators to avoid the use of intrusive linear position transducers or other undesirable instrumentation while obtaining a more accurate calculation of the actual amount of fluid that has been relieved, including as compared to a "fully-open" valve assumption.

In some embodiments, a flow capacity for a particular valve at a particular time or over a particular interval can be determined based upon a run-time valve lift factor that has been determined as outlined above. For example, prior calibration operations can be used to create a look-up table of valve capacity at particular valve lifts (e.g., based on a particular correlation or particular correlations), to be referred to upon determination of a relevant run-time valve lift. Or guidelines on restricted lift capacity such as those published by the American Society of Mechanical Engineers or other relevant organizations can be used.

In some embodiments, as also noted above, use of appropriate predetermined correlations can support monitoring of valve lift using only a single data transmitter. For example, a two-variable transmitter can be configured to detect and transmit run-time absolute or gauge pressure and pressure differential data, which can then be converted, as needed, to a relevant run-time pressure factor and then to a relevant run-time lift factor that is estimated based on a predetermined correlation with the run-time pressure factor. Or, in some implementations, a single-variable transmitter can be configured to detect and transmit only run-time pressure differential data, which can be converted to a relevant run-time absolute or gauge pressure based upon a first predetermined correlation and then to a run-time lift factor that is estimated based on a second predetermined calibration. Generally, in both such cases, the estimated run-time lift factor can then be used to calculate run-time operational flow capacity of the relief valve. In some instances, a valve flow factor (e.g., flow capacity) can be calculated directly from a valve pressure factor, without measuring or calculating a valve lift factor.

Generally, as used herein, a "pressure factor" refers to a parameter that is indicative of a particular pressure state for a given valve. In some implementations, a pressure factor can be determined as an absolute or gauge pressure value. In some implementations, a pressure factor can be determined as a dimensionless indicator of pressure, such as a pressure ratio of absolute (or gauge) pressures or a ratio of a pressure differential to a particular pressure or a different pressure differential. In some implementations, a dome reduction can be used as a pressure ratio, i.e., a ratio of dome pressure to inlet pressure.

Similarly, as used herein, a "valve lift factor" generally refers to a parameter that is indicative of a particular state of a given valve relative to permitted or blocked flow therethrough. In implementations in which a valve piston regulates flow through a valve, a valve lift factor refers to a parameter that is indicative of a physical state of the valve piston. In some implementations, a valve lift factor can be determined as an absolute or relative displacement value for a valve piston. In some implementations, a valve lift factor can be determined as a dimensionless indicator of valve lift, such as a lift ratio of actual valve lift to rated valve lift (e.g., a percentage that indicates a degree to which a particular valve is open, as compared to a fully-opened configuration).

Also as used herein, a "valve flow factor" generally refers to a parameter that is indicative of a particular capacity of a valve for flow therethrough. In some implementations, a valve flow factor can be determined as an absolute flow rate or other similar parameter. In some implementations, a valve flow factor can be determined as a dimensionless ratio of actual flow capacity to rated flow capacity, such as a conventionally defined discharge coefficient (i.e., a ratio, at a given valve state, of actual flow capacity to rated flow capacity).

Figure 1B:
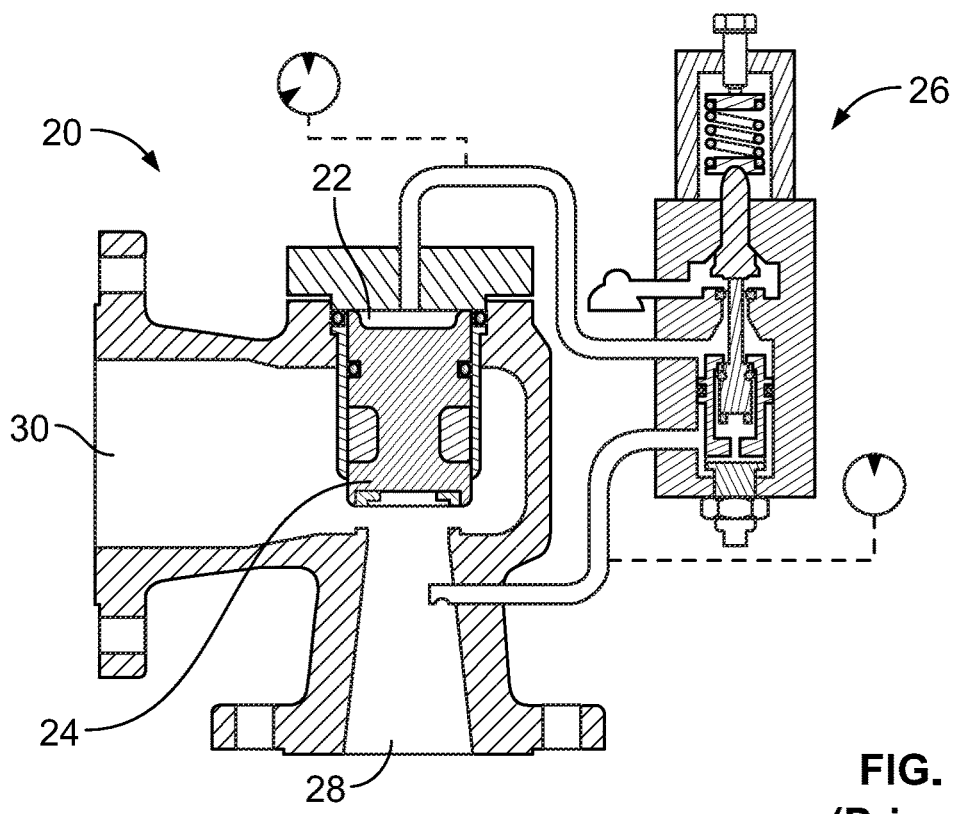

FIGS. 1A and 1B illustrate a conventional high-pressure pilot-operated relief valve 20 with a dome 22, a piston 24, a pilot valve 26, a valve inlet 28 and a valve outlet 30. In general, the valve 20 is configured to relieve pressure from the valve inlet 28 (i.e., to relieve "inlet" or "tank" pressure) when the pressure reaches a set pressure. In particular, when the inlet pressure is sufficiently low, pressure at the valve inlet 28 can equal pressure at the dome 22, and a valve seat on the piston 24 can seal the valve against flow from the valve inlet 28 to the valve outlet 30 (see FIG. 1A). However, when the inlet pressure reaches a set pressure, the pilot valve 26 can operate to effect a reduced pressure at the dome 22. As a result, the pressure in the valve inlet 28 can drive the piston 24 to open (upwards from the perspective shown) and pressurized fluid can be vented from the valve inlet 28, past the piston 24, to the valve outlet 30 (see FIG. 1B).

As also alluded to above, in conventional approaches, correlations can be predetermined, for particular valves, between a discharge coefficient and a valve lift ratio. This can allow an estimated magnitude of fluid flow through a valve to be calculated using measured run-time valve lift data. For example, the valve lift and the valve flow can be measured during a calibration process for a particular relief valve. using a linear transducer and a flow meter, or other relevant sensing technology. Having measured both the lift and the flow during various relief events and system conditions, the correlation between the two values can be predetermined. During run-time, actual valve lift can then be measured, to be correlated to actual flow through the valve.

Figure 1C:
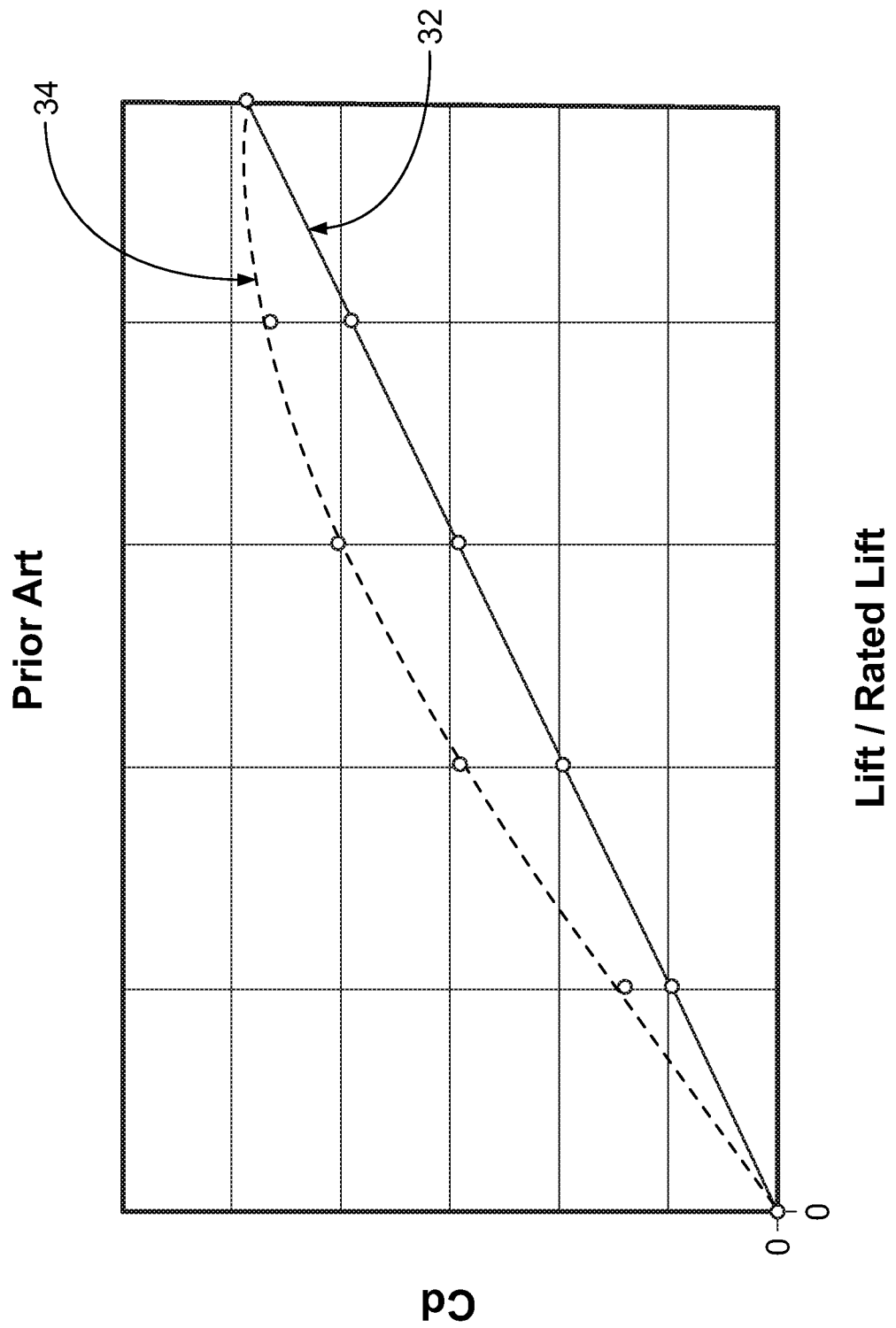
FIG. 1C is a graph of measured discharge coefficients and valve lift ratios of the pilot relief valve of FIGS. 1A and 1B.

FIG. 1C illustrates an example correlation between discharge coefficient and a valve lift ratio for a conventional high-pressure pilot-operated relief valve such as the relief valve 20 illustrated in FIGS. 1A and 1B. In particular, FIG. 1C illustrates an example curve 32 that provides a restricted, linear approximation of a discharge coefficient (Cd) and an example curve 34 that provides a more precise indicator of the discharge coefficient, each for a given lift ratio (LR). With these or other similar correlations having been determined, a run-time valve lift can be measured with a position sensor, such as a linear transducer. Then, the known correlation between the valve lift factor and the valve flow factor, as shown in FIG. 1C, can be used to estimate the magnitude of fluid flow out of the relief valve based on the measured run-time valve lift. As noted above, however, the need to actively measure valve lift during runtime (e.g., with a linear transducer) may introduce substantial complications or costs.

Figure 2B:
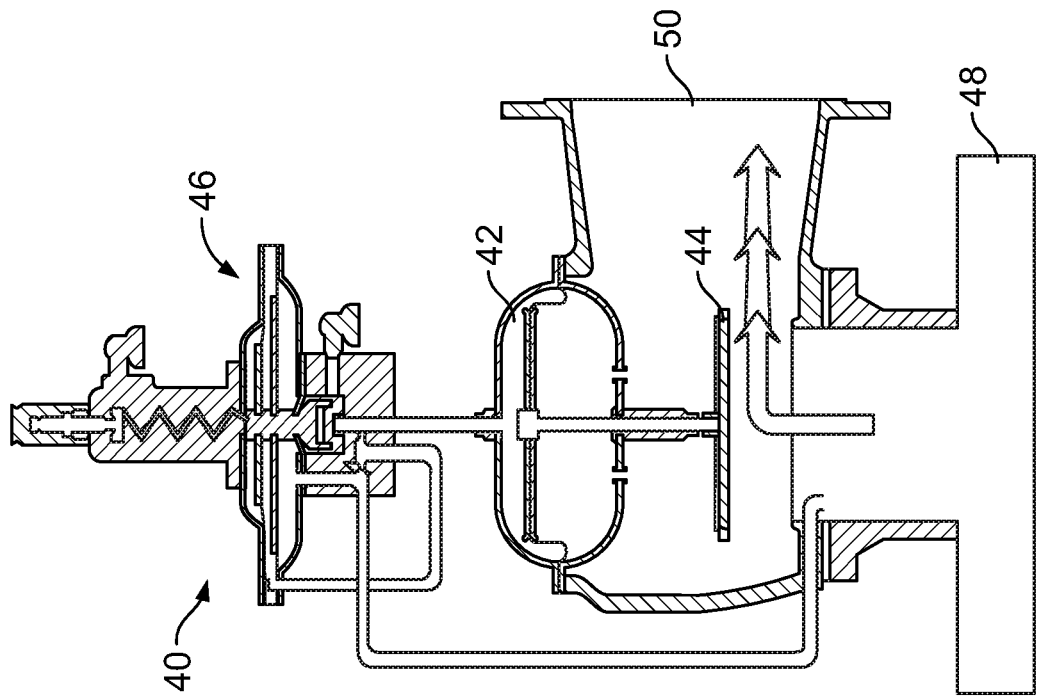
FIGS. 2A and 2B are schematic views of a conventional pilot relief valve.
Figure 2A:
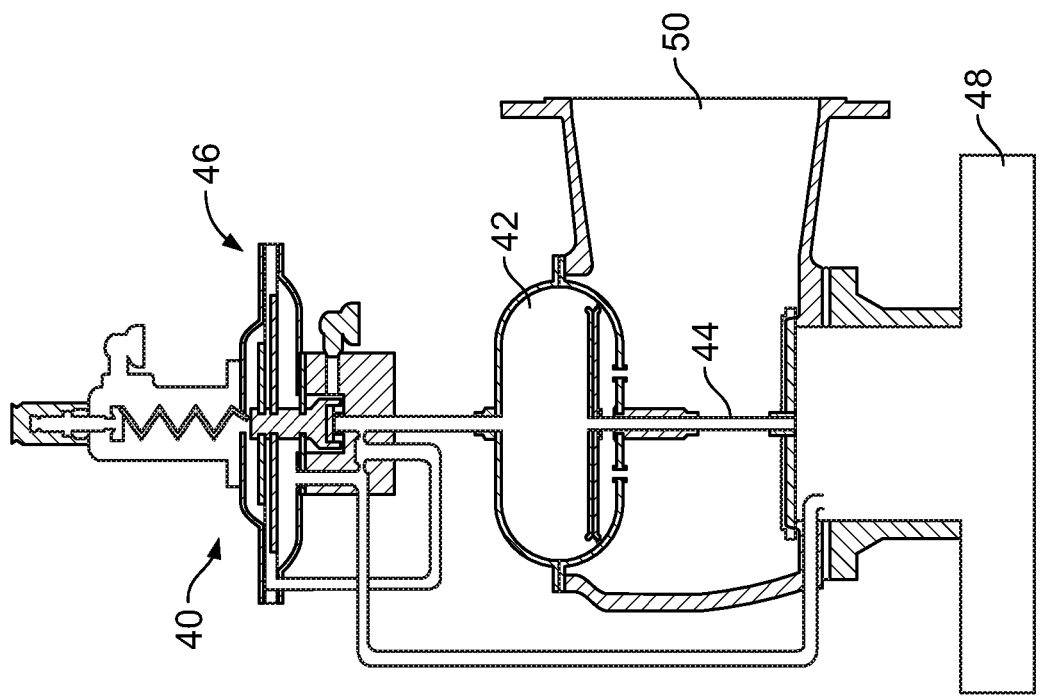

In other implementations, other types and configurations of pilot-operated pressure relief valves are possible, with other corresponding relationships between valve lift and flow. For example, FIGS. 2A and 2B illustrate a conventional low-pressure diaphragm-type pilot-operated pressure relief valve 40 with a dome 42, a piston 44, a pilot valve 46, a valve inlet 48 and a valve outlet 50. Generally, the valve 40 can operate similarly to the valve 20, with the pilot valve 46 regulating pressure in the dome 42 based upon pressure at the inlet 48, in order to allow the piston 44 to lift (see FIG. 2B) during over-pressure events.

In some embodiments, in particular for applications involving low-pressure pilot-operated pressure relief valve like the relief valve 40 of FIG. 2A-B, a discharge coefficient (Cd) can be determined as a function of valve lift ratio (LR) and valve pressure ratio (PR), calculated. An example of a correlation 52 between Cd, LR, and PR is illustrated in FIG. 2C.

To generate the correlation 52, a sensor to measure volumetric fluid flow, a sensor to measure valve lift, and at least one pressure sensor can be used to measure data during calibration testing and the resulting data plotted and interpolated. As with high pressure valves, however, use of the correlation 52 under conventional approaches to predict run-time flow through a valve can still require users to measure the run-time valve lift and at least one run-time pressure. And, as also discussed above, the need for run-time measurements of valve lift can introduce substantial complexity and costs.

Thus, it can be seen that conventional methods for predicting run-time flow through a valve can be relatively complex or cumbersome. For example, for run-time use of the high-pressure valve correlation shown in FIG. 1C and the low-pressure valve correlation shown in FIG. 2C, the measurement of run-time valve lift is required. For reasons detailed above, and others, a system and method for estimating a magnitude of flow out of a pilot-operated relief valve assembly during a relief event, using only measured run-time pressure can be useful.

In some embodiments of the invention, relief valves similar to the valves 20, 40 (and others) can be instrumented with pressure measurement assemblies to record and transmit operating pressure data for calculation of valve lift based on predetermined correlations. In some embodiments, local computing devices can be provided to perform similar calculations without necessarily requiring transmission of pressure data. As detailed below, even single-gauge (or other) pressure measurements can be used to effectively determine the amount of flow through a valve during run-time operations.

Figure 3B:
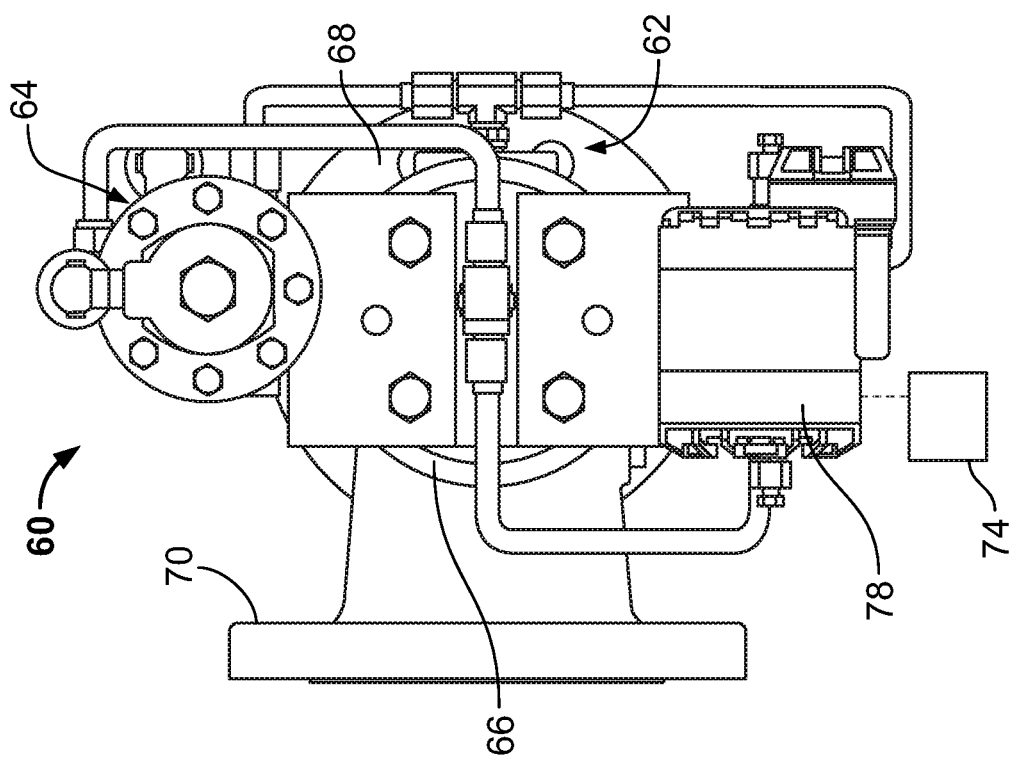
FIG. 3B is a top plan view of the pilot-operated relief valve assembly of FIG. 3A.
Figure 3A:
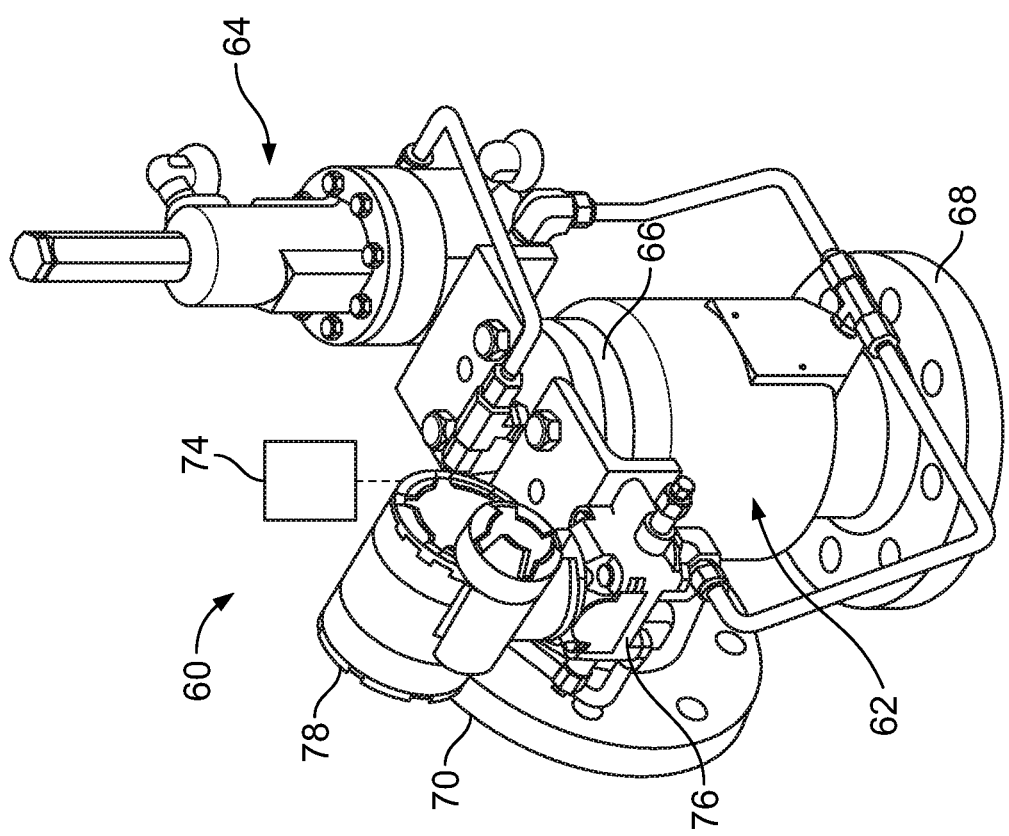
FIG. 3A is an isometric view of a pilot-operated relief valve assembly according to an embodiment of the invention.

FIGS. 3A and 3B illustrate a pilot-operated relief valve assembly 60 that is configured for operation according to an embodiment of the invention. In the embodiment illustrated, the valve assembly 60 includes a relief valve 62 that is generally similar to the valve 20 of FIGS. 1A and 1B, with a pilot valve 64, a dome 66 in fluid connection with the pilot valve 64, and a valve inlet 68 in fluid communication with the pilot valve 64 and the dome 66. Also similarly to the valve 20, the valve 60 also includes a valve outlet 70, and a valve seat (not shown) and is configured to selectively permit or prevent fluid flow between the valve inlet 68 and the valve outlet 70 based on the fluid pressure at the valve inlet 68, which fluid pressure controls the state of the pilot valve 64, and the pressure differential between the dome 66 and the valve inlet 68. In other embodiments, other types of relief valves can be used.

In some embodiments, a valve assembly can further include a local or remote control system. For example, FIGS. 3A and 3B further illustrate a control system 74 that receives measurements of pressure data (or associated pressure factors, such as pressure ratios) from a pressure detection assembly, such as a transmitter 78, that includes one or more pressure detectors (not shown). As will be understood, a pressure transmitter such as the transmitter 78 may include one or more pressure sensors to measure fluid pressure (or a difference between different fluid pressures) received at one or more transmitter inputs, for which the delivery of fluid may be controlled, for example, via a manifold such as a manifold 76 (see FIG. 3A). In some embodiments, a transmitter can additionally include circuitry to transmit the measured pressure(s) via wireless transmission or wired channels.

As used herein, a pressure detection assembly refers to an assembly, such as the transmitter 78, for example that includes one or more pressure detectors and is configured to record or transmit measurements of pressure data for further processing. In different embodiments, different types of pressure detectors can be used, including a wide variety of known pressure sensors. For example, a pressure detection assembly can include sensors such as a capacitance sensor or a piezoresistive sensor, or various custom pressure sensing configurations. For example, a custom sensor can include a diaphragm with a Wheatstone bridge with foil gages on the diaphragm, sets of strain wire wrapped around a pressurized tube and tied together to form a Wheatstone bridge, or other Wheatstone bridge configurations or custom designs. In some embodiments, a pressure detection assembly can be configured as a multivariable transmitter that integrates measurements such as differential pressure, static pressure, and temperature. In some embodiments, pressure detection assemblies can include sensors configured as (or with) transducers, so that electrical or other signals corresponding to sensed pressure can be transmitted to be recorded or processed. As used herein, reference to determining, transmitting, analyzing, or otherwise processing a "pressure" is intended to encompass, interchangeably, physical measurement of fluid pressure, conversion of the physical measurement to signals having other forms (e.g., electrical signals), and processing of those signals in various ways.

In some embodiments, the control system 74 can include a local processor device (not shown) that can be used to execute part or all of the operations discussed herein to determine valve lift or valve flow capacity. For example, rather than or in addition to the transmitter 78 transmitting pressure data to a remote controller, a local processor device can locally execute one or more useful operations on the pressure data, alone or in combination with a remote processor device. In some embodiments, as also discussed below, the control system 74 can include a remotely located processor device, including such as may be provided at a remote server that is configured to provide analytic or monitoring services for one or more facilities.

In different embodiments, one or more transmitters 78 (or another pressure detection assembly) can be configured to measure different aspects of pressure relative to a pressure relief valve. For example, in the embodiment illustrated in FIGS. 3A and 3B, the pressure detection manifold 76 receives fluid pressure from the valve inlet 68 and the dome 66 via tubing connections. Depending on its type and setup, the transmitter 78 may be configured to measure and transmit one or more of a pressure differential between the valve inlet 68 and the dome 66, a dome pressure within the dome 66, or an inlet pressure within the valve inlet 68. In some embodiments, the transmitter 78 may be configured to measure and transmit only pressure differential and one (but not both) of the inlet pressure or the dome pressure. In some embodiments, the transmitter 78 may be configured to measure and transmit only absolute or gauge pressure within one or both of the dome 66 and the valve inlet 68, or only the pressure differential between the valve inlet 68 and the dome 66. In some embodiments, two pressure transmitters (e.g., each having its own manifold) may be utilized to measure the absolute or gauge pressure at each of the valve inlet 68 and the dome 66, respectively.

In some implementations, raw pressure data can be transmitted by the transmitter 78 to the control system 74. In some implementations, pressure data can be processed to varying degrees before transmission (or not transmitted at all). For example, processor devices associated with the transmitter 78 can be configured to convert recorded pressure to a pressure factor, such as a ratio between dome and inlet pressures, and to transmit the pressure factor to a remote control system. In some implementations, as also noted above, the control system 74 may be a local control system that partially or fully processes the pressure data to determine valve lift (as further described below). In such an embodiment, the local control system 74 may or may not further transmit the pressure, valve lift, and/or flow (or other) data to an additional control system (e.g., a distributed control system, a programmable logic controller, an asset management system, etc.)

In some embodiments, the correlations determined during calibration operations, as discussed in detail below, can be determined remotely and used locally by the control system 74. For example, a mathematical relationship or a look-up table, based on the correlation, can be produced remotely and then used locally with the control system 74. In some embodiments, the correlation can be provided as raw data stored on a computer readable media and/or a computer accessible program stored on a computer readable media. As such, the raw data and/or computer accessible programmed can be produced, stored, packaged, or otherwise tangibly embodied on a computer readable media at a remote location and locally used with the control system 74.

In some embodiments, as also discussed below, further operations may also be possible. For example, in some embodiments, a local or remote processor can be configured to determine, based upon a calculated run-time lift factor or other related parameters, a total run-time fluid flow past the valve seat at a given time or over a given time interval, such as a magnitude of total flow (or flow rate) during a relief event.

Figure 4:
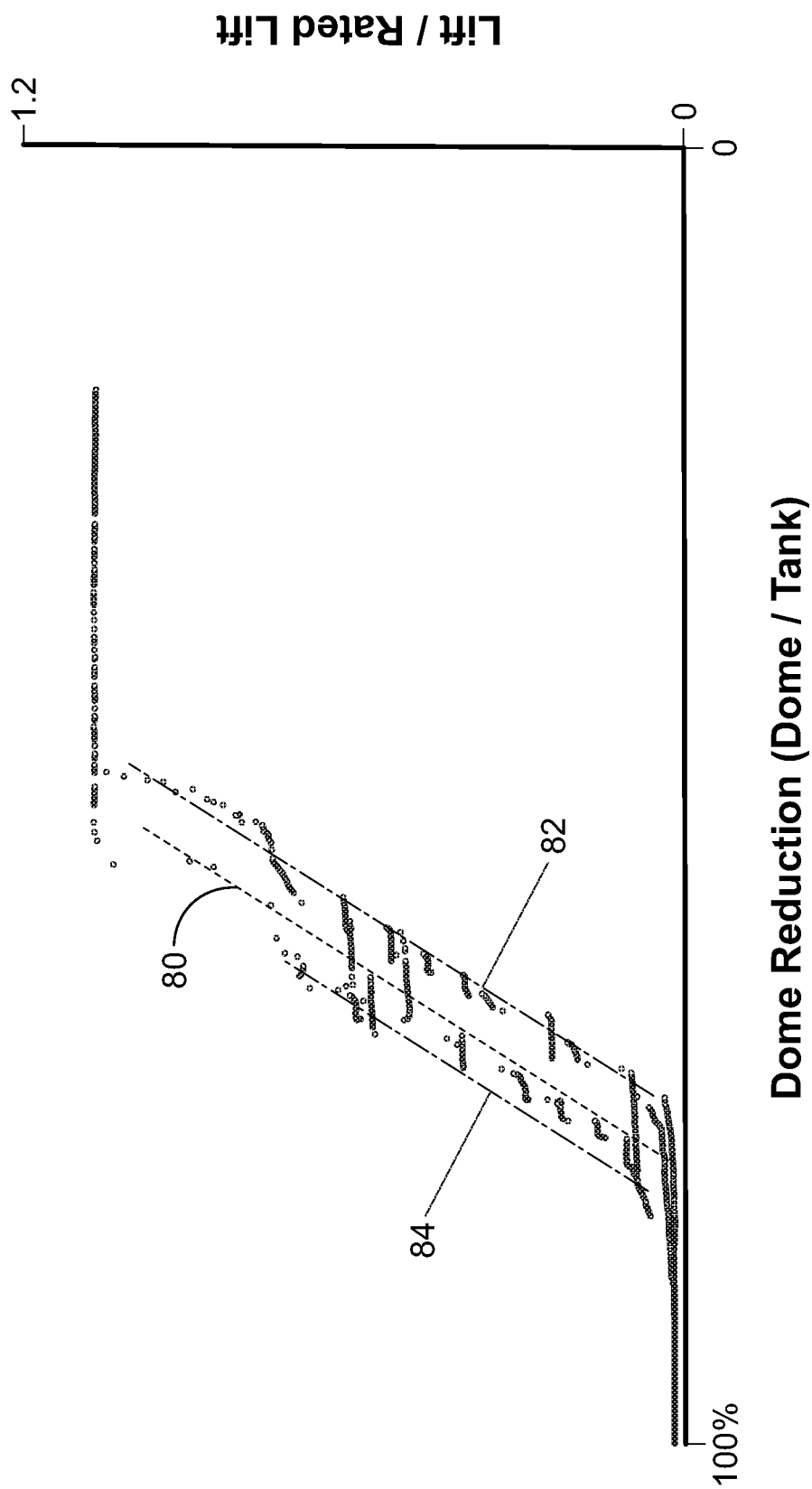
FIG. 4 is a graph of measured pressure factors and valve lift factors, and an associated correlation, for the valve assembly of FIG. 3A.

To facilitate monitoring the valve assembly 60 based solely (or otherwise) on pressure measurements, calibration operations for the valve assembly 60 can be executed in order to determine correlations between pressure data from the valve assembly 60 and valve lift (or other factors, such as flow capacity). FIG. 4 illustrates an example of correlation data collected during calibration for a particular high-pressure pilot-operated relief valve assembly (e.g., the valve assembly 60) at a particular pilot valve pressure set point (e.g., 100 psig). In particular, the illustrated correlation data demonstrates a relationship between a pressure factor and a valve lift factor. In the illustrated embodiment of FIG. 4, the pressure factor is a dome reduction equal to a ratio of the dome pressure to the inlet pressure, and the valve lift factor is a ratio of actual valve lift to rated valve lift, although other formulations are possible. As such, during calibration operations represented in FIG. 4, sensors for the relevant valve may have been configured to measure, directly or indirectly, dome pressure, inlet (or tank) pressure, and actual valve lift.

During a calibration process, correlation data such as represented in FIG. 4 can be measured for a particular valve at a particular operating condition, for a particular valve at a variety of operating conditions, for a set of valves at a particular operating condition, or for a set of valves at a variety of operating conditions. Based upon the acquired data, one or more appropriate correlations can then be determined for one or more of the relevant valves and operating conditions. Subsequently, during run-time operation of a corresponding valve in corresponding operating conditions, an appropriate correlation can be selected to relate measured pressure data to a run-time lift factor of the valve or other factors (e.g., valve flow factors that are similarly estimated based on predetermined correlations).

For the particular valve and operating conditions represented in the data of FIG. 4, a substantially linear relationship can be determined between dome reduction and lift ratio, over substantially all of a modulated pressure-relief event. In some embodiments, a linear relationship may apply over a more limited range of pressure factors. Further, in other implementations, other correlations can be determined, including non-linear correlations.

As also illustrated in FIG. 4, operation of a relevant valve under particular operating conditions may be subject to hysteresis. As a result, a specific correlation between dome reduction and lift ratio as a valve is opening may differ from a specific correlation between these factors as the valve is closing. In this respect, for example, it may be possible in some cases to determine multiple correlative relationships between the pressure factor and the lift factor.

In some implementations, relatively similar—e.g., similarly linear—behavior between opening and closing correlations may allow for a single correlation, such as a linear correlation 80 of FIG. 4, to be effectively applied regardless of whether a valve is opening or closing. This may be useful, for example, in installations with relatively low sampling frequencies, which may result in uncertainty relative to whether particular pressure measurements are associated with a valve opening or closing. In some implementations, separate correlations can be predetermined and applied for valve opening and valve closing, respectively, or other operations or operational states. For example, if appropriate sampling rates can be obtained, so that it can be accurately assessed whether a valve is opening or closing during run-time, correlations 82, 84 can be used for valve opening and closing, respectively.

In some implementations, using an appropriate correlation, such as the correlation 80 established as illustrated in FIG. 4, valve lift of a relevant valve assembly can be determined for relevant operating conditions based exclusively (or primarily) on run-time pressure measurements. For example, with regard to the pilot-operated relief valve assembly 60 of FIGS. 3A and 3B, a correlation similar to the correlation 80 of FIG. 4 (or correlations 82, 84, and so on) can be used to determine run-time valve lift (or other factor) based upon measured (or derived) pressures at the valve inlet 68 and the dome 66. In this regard, for example, the transmitter 78 can be configured to measure a pressure differential between the valve inlet 68 and the dome 66 along with absolute or gauge pressure at the dome 66 or the valve inlet 68, to measure absolute or gauge pressure at both the dome 66 and the valve inlet 68, or to measure some subset of these pressures for combination (e.g., remotely) with data from other pressure sensors (e.g., a gauge pressure attached to the relevant pressure vessel, rather than to the assembly 60). In this regard, for example, as also discussed above, the transmitter 78 can sometimes include two pressure detectors, measuring either the inlet pressure and a pressure differential, the dome pressure and a pressure differential, or the inlet pressure and the dome pressure. In some embodiments, any two of these values (dome pressure, inlet pressure, and dome-inlet pressure differential) can be used to calculate the dome reduction that is used in the correlation 80, including as may be estimated based on measurements made remotely from the valve 60 (e.g., as may be possible for inlet pressure).

In some embodiments, it may be possible to utilize correlations such as the correlation 80 of FIG. 4 based upon only a single pressure measurement. For example, based upon further calibration operations, it may be possible to correlate a pressure factor (e.g., dome reduction) with overpressure (i.e., a scaled measure of inlet pressure relative to set pressure), such that pressure differential data alone can be used to determine dome reduction. The derived pressure factor can then be used in combination with correlations of pressure factor to lift factor, such as described above, to determine a run-time valve lift (or other factor) based upon only a single run-time pressure measurement. In this regard, for example, it may be possible to utilize a pressure transmitter (or other pressure detector assembly) that is configured to detect a single pressure, such as a single run-time pressure differential between the valve inlet 68 and the dome 66 (see FIGS. 3A and 3B). Further, as also noted above, some relevant measurements can be obtained by instruments that are more directly associated with other equipment. As will be understood, a transmitter that is configured to obtain a single pressure measurement (e.g., dome-inlet differential) may be less expensive to acquire and maintain than multiple pressure transmitters each configured to measure a single pressure.

Figure 5:
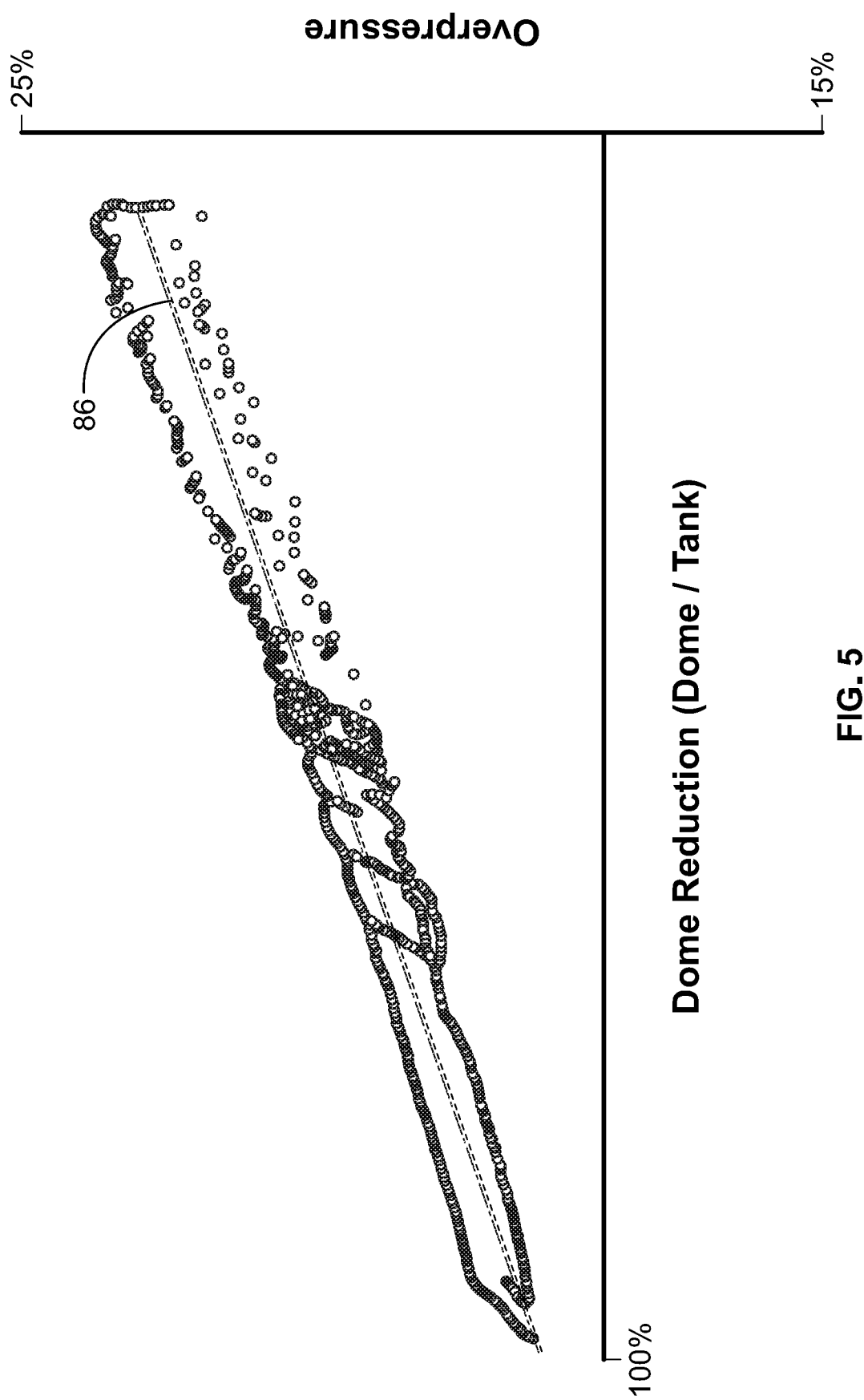
FIG. 5 is a graph of measured pressure factors and overpressures for the valve assembly of FIG. 3A.

With appropriate calibration, it may sometimes be possible to derive certain pressure data from other pressure measurements, so that a single pressure transducer can be used to derive the dome reduction value that is necessary to determine the lift ratio using the correlation described above. For example, FIG. 5 illustrates data from an example calibration operation to determine a correlation between dome reduction and overpressure for a valve and operating conditions similar to those represented in FIG. 4. Usefully, data collected to support generation of a correlation as in FIG. 4 may be substantially similar to data collected to support generation of a correlation as in FIG. 5. For example, for the illustrated implementation, appropriate calibration data for the correlations of FIGS. 4 and 5 can be acquired by instrumenting a valve of known set pressure to record inlet pressure, dome pressure, and valve lift, then correlating (graphically or numerically) corresponding pressure factors to corresponding lift factors and to corresponding overpressures.

In some implementations, including as illustrated in FIG. 5, a linear (or other) correlation can be established between a pressure factor (e.g., dome reduction) and overpressure (e.g., a dimensionless overpressure, represented in FIG. 5 as the difference between inlet pressure and set pressure divided by the set pressure). Using such a correlation, an inlet (or dome) pressure can then be determined based solely on a measured pressure differential between the inlet and dome. For a linear correlation in particular, for example, the illustrated calibration data can be used to determine a relationship between the inlet pressure, the pressure set point, and the differential pressure as shown by Equation 1, $$T = \frac{(SP + SP*c + SP*m) \pm \sqrt{((SP + SP*c + SP*m)^2 - 4*SP*m*\Delta P)}}{2},$$ (1)

in which T=run-time inlet pressure, SP=pressure set point, $\Delta P$=measured run-time pressure differential between the inlet and the dome, and c and m are correlation coefficients for the relevant linear correlation, such as a linear correlation 86 of FIG. 5. In other implementations, other approaches are possible. For example, a similar approach can be used to determine dome pressure rather than inlet pressure, or a non-linear correlation can be determined and applied.

Regardless of whether linear or non-linear correlations are determined for valve operations, a combination of correlations, such as the examples illustrated in FIGS. 4 and 5, can allow a run-time lift factor to be determined using only a single (and single-variable) pressure detector. For example, a single pressure transmitter can be configured to measure the pressure differential between the valve inlet 68 and the dome 66. The detected run-time pressure differential data, the (known) pressure set point, and the correlation coefficients for the valve assembly 60 can be entered into Equation 1 (or another linear or non-linear equation to relate pressure values) or compared to a relevant look-up table to determine the run-time inlet pressure. The dome pressure, and the dome reduction, can then be derived from the measured pressure differential and the calculated inlet pressure, and the run-time valve lift can be calculated based on the correlation 80 illustrated in FIG. 4.

Further, by using predetermined correlations between a valve lift factor and a valve flow factor, such as the conventional correlations 32, 34 illustrated in FIG. 1C for a high-pressure valve or the conventional correlation 52 illustrated in FIG. 2C for a low-pressure valve, the estimated run-time valve lift can be used to calculate a run-time valve flow factor, such as a magnitude of flow over a time interval. In this way, for example, users can determine (e.g., estimate) how much fluid has passed through a relevant pilot-operated relief valve during a relief event based on only prior calibrations and run-time pressure measurements.

Additionally, in some embodiments, a combined calculation can be used in order to determine a valve flow factor (e.g., discharge coefficient) or total magnitude of flow based on run-time pressure measurements, without needing to measure valve lift or complete intermediate calculations of valve lift factors (or other values). In this regard, some systems can be configured to combine correlations from prior calibration so that run-time pressure measurements at a pilot-operated relief valve can be correlated directly to relevant valve flow factors. For example, it may be possible to combine any of the conventional correlations 32, 34, 52 with predetermined correlations between the valve pressure factor and the valve lift factor in order to arrive at a master correlation solely between pressure and discharge coefficient. In this way, the discharge coefficient (or other relevant valve flow factor) can be calculated directly from a run-time valve pressure factor, without necessarily requiring an intermediate calculation of a run-time valve lift or other run-time valve lift factor.

As illustrated in FIG. 5, similarly to FIG. 4, operation of some valves at relevant operating conditions may be subject to hysteresis relative to a pressure factor and overpressure measurements. As a result, a specific correlation between a pressure factor (e.g., dome reduction) and overpressure as the valve is opening may differ from a specific correlation between these factors as the valve is closing. In some implementations, multiple correlative relationships between the pressure factor and the overpressure may be determined in some cases, such as separate correlations for separate valve regimes, including separate correlations for valve opening and valve closing events.

In some implementations, however, relatively similar— e.g., similarly linear—behavior between opening and closing correlations may allow for a single correlation, such as the linear correlation 86 of FIG. 5, to be applied effectively regardless of whether a valve is opening or closing. This may be useful, for example, in installations with relatively low sampling frequencies, which may result in uncertainty relative to whether particular pressure measurements are associated with a valve opening or closing. In some instances, measurements associated with valve opening can be separated from measurements associated with valve closing through post-processing methods. Separate correlations can then be predetermined and applied for valve opening and valve closing (or other operations).

Figure 6:
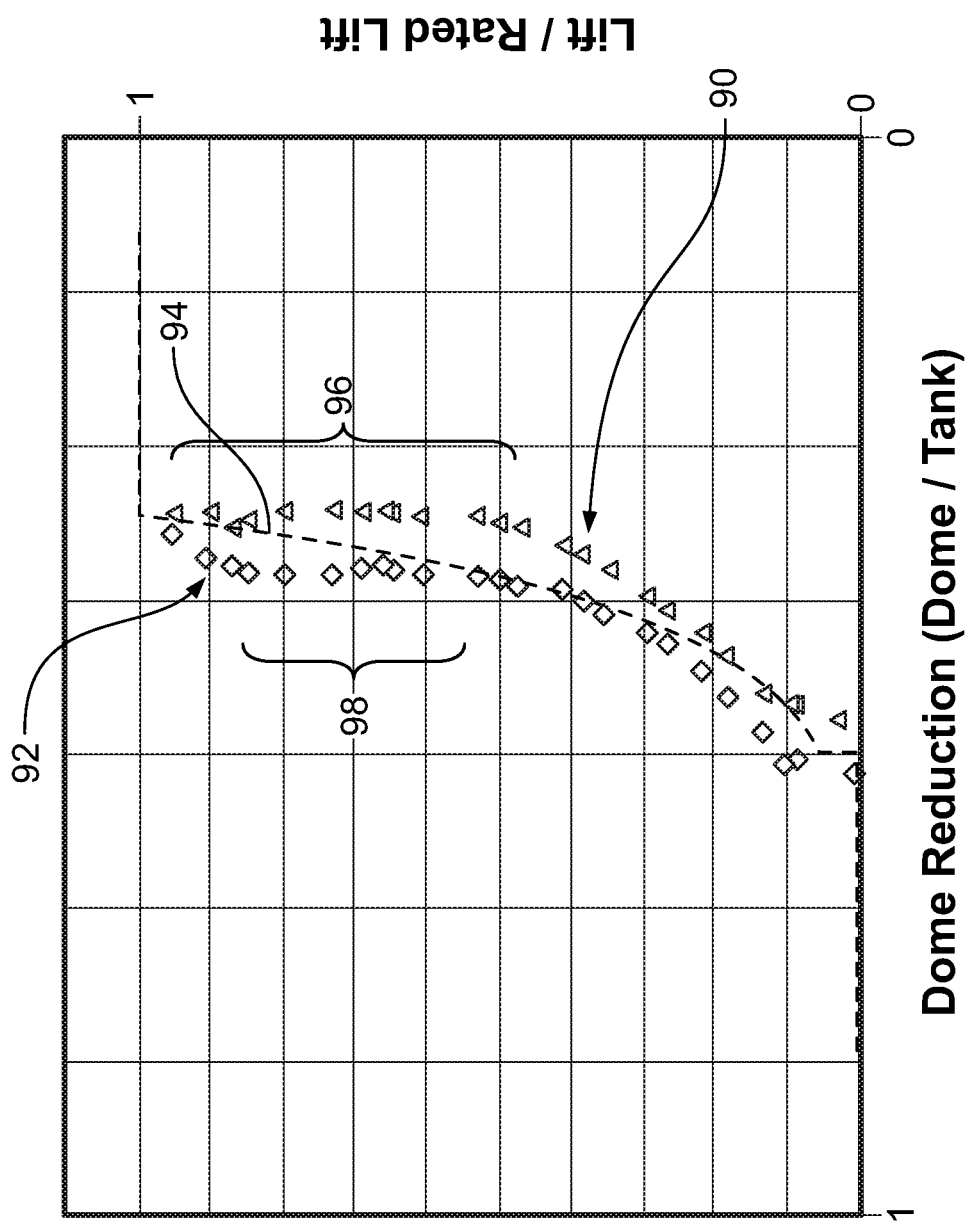
FIG. 6 is a graph of measured pressure factors and valve lift factors, and an associated correlation, for a valve assembly according to an embodiment.

FIG. 6 illustrates an example graph of post-processed lift factor data and pressure factor data for another example pilot-operated relief valve assembly. In FIG. 6, the pressure factor and valve lift factor measurements associated with valve opening and valve closing have undergone post-processing to create a data set that is substantially evenly weighted between measurements of valve opening data 90 and measurements of valve closing data 92. In this way, when a single correlation 94 is created from an aggregate of closing and opening event measurements, any skewing of the correlation 94 toward opening or closing events can be minimized. Further, an even distribution of points along the valve lift factor axis can be extracted and used to minimize any skewing that might occur toward a cluster of measurements at a particular valve lift measurement. Regardless, in some cases, the resulting correlation (e.g., the correlation 94) may be more accurate for an opening event than for a closing event (or vice versa), or for certain measurement ranges of the resulting correlation. For example, the opening accuracy over a range 96 and the closing accuracy over a range 98 may differ from one another. In this case, a calculated maximum deviation can be used to supplement the correlation.

Figure 7:
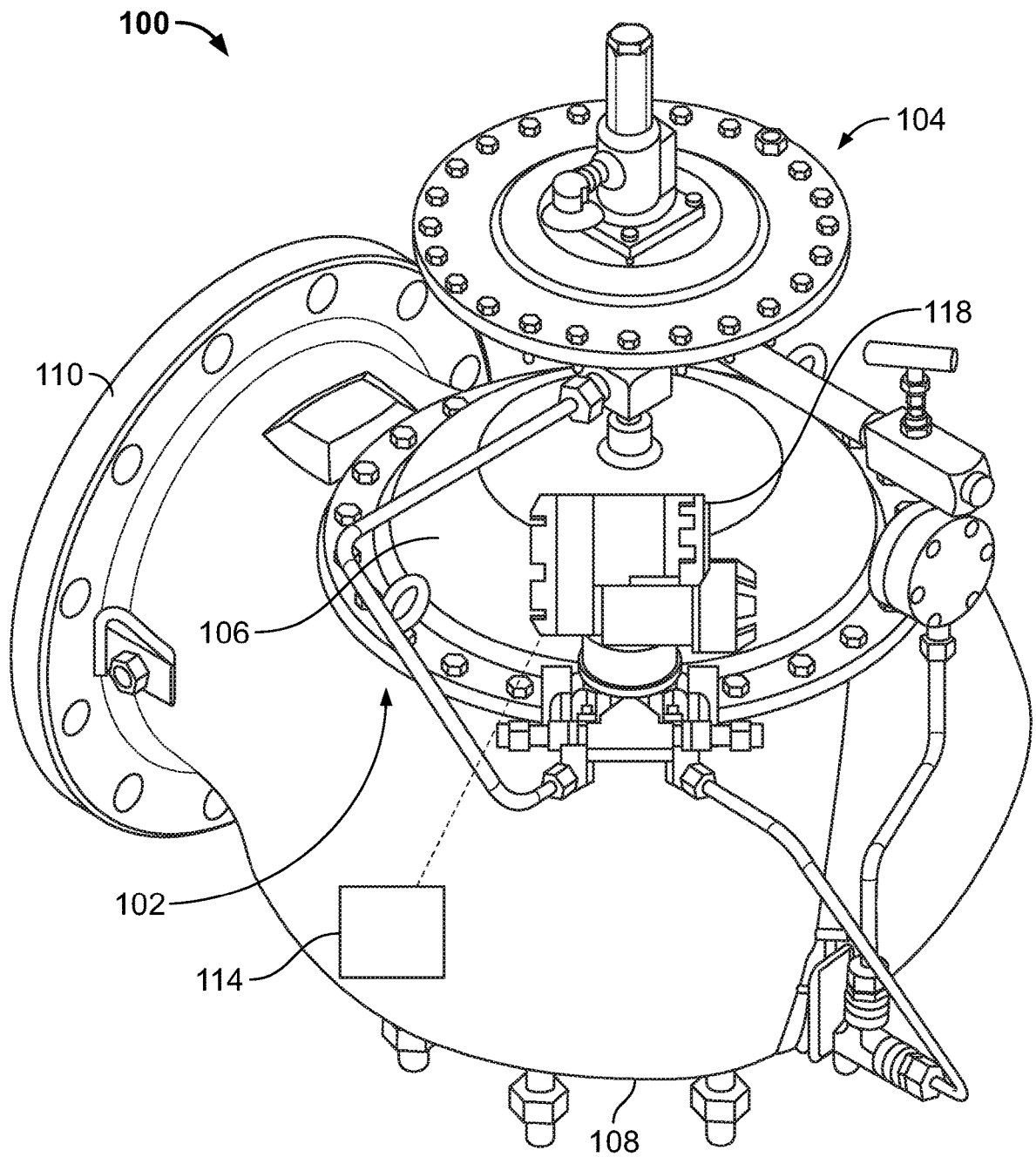
FIG. 7 is an isometric view of a pilot-operated relief valve assembly according to an embodiment of the invention.
Figure 8:
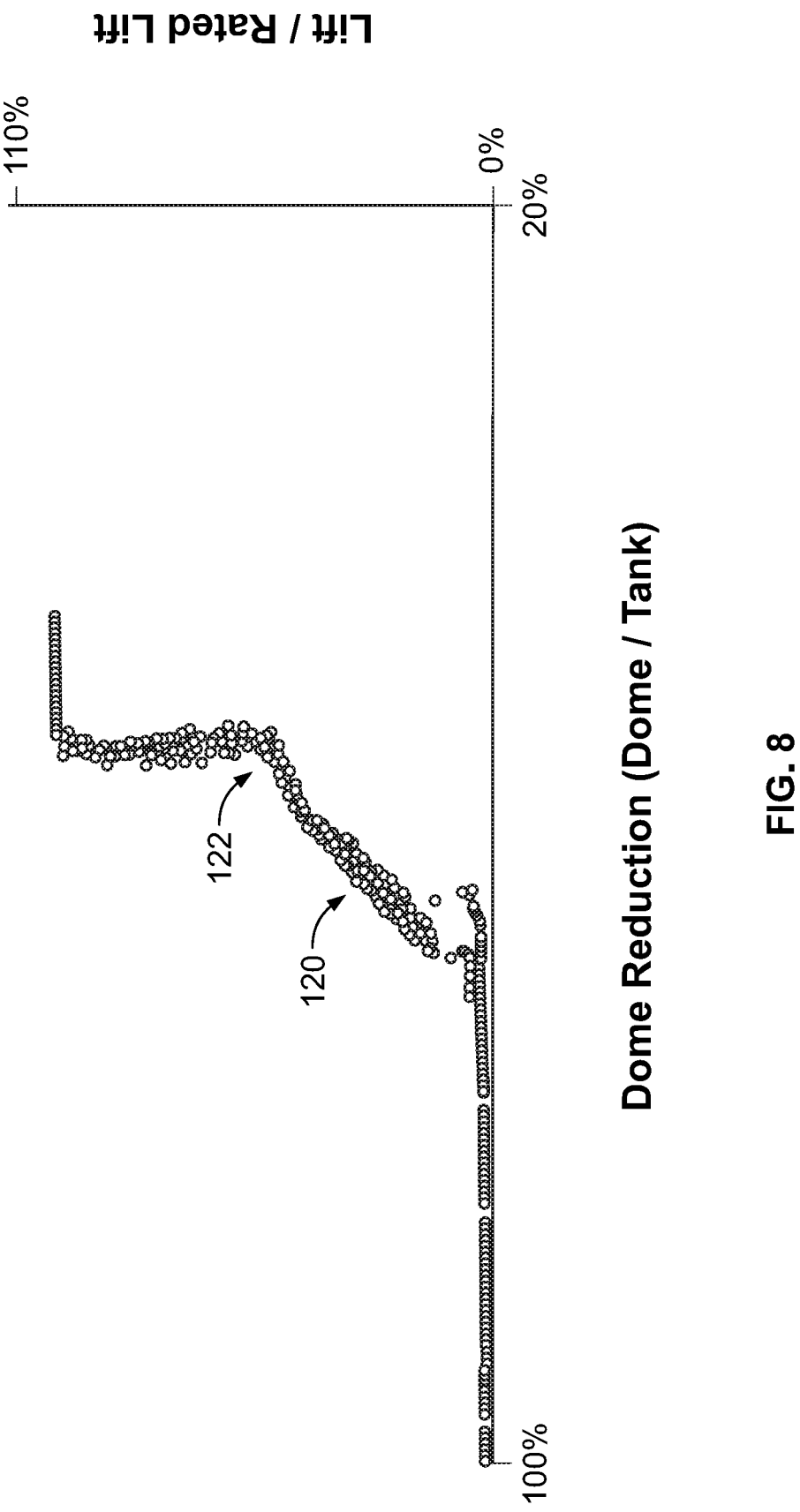
FIG. 8 is a graph of measured pressure factors and lift factors for the valve assembly of FIG. 7.

In some embodiments, similar operations as those described above can be implemented with regard to a low-pressure relief valve assembly, such as a diaphragm-type pilot-operated relief valve assembly 100, as illustrated in FIG. 7. Somewhat similarly to the valve assembly 60, the valve assembly 100 includes a relief valve 102 that is generally similar to the valve 40 of FIGS. 2A and 2B, with a pilot valve 104, a dome 106 in fluid connection with the pilot valve 104, a valve inlet 108 in fluid communication with the pilot valve 104 and the dome 106, a valve outlet 110, and a valve seat (not shown). Likewise, the relief valve assembly 100 is configured to selectively permit or prevent fluid flow between the valve inlet 108 and the valve outlet 110 based upon the fluid pressure at the valve inlet 108, which fluid pressure controls the state of the pilot valve 104, and the pressure differential between the dome 106 and the valve inlet 108.

Also similarly to the valve assembly 60, the valve assembly 100 can include a local or remote control system. In the illustrated embodiment, for example, the valve assembly 100 includes a control system 114 that communicates (e.g., via a wired or wireless link) with a single- or multiple-variable transmitter 118.

For a particular configuration of the valve assembly 100, appropriate correlations between pressure and lift factors and, as appropriate, between pressure factors and overpressure, can be determined, including with similar calibration operations as described above. In this regard, however, some aspects of the resulting correlations may vary from correlations for high-pressure (e.g., non-diaphragm) valves, such as the examples illustrated in FIGS. 4 and 5. As illustrated in FIG. 7, for example, calibration data for the valve assembly 100 exhibits a substantially linear portion 120, with relatively little hysteresis, and a step change 122 at a particular dome reduction. This may result, for example, from physical characteristics of the dome 106 and the associated diaphragm (not shown). Regardless of this difference in operational characteristics, however, the resulting correlation(s) can be used in a similar manner as described above relative to the valve assembly 60 in order to determine run-time valve lift (or another run-time lift or flow factor) for the valve assembly 100 based only upon known operating conditions and measured run-time pressure or pressure differential. Further, although the valve lift at the step change may be generally known for some valve configurations, the identification of the corresponding dome reduction may have value, including as part of correlation operations as discussed above or otherwise.

Figure 9:
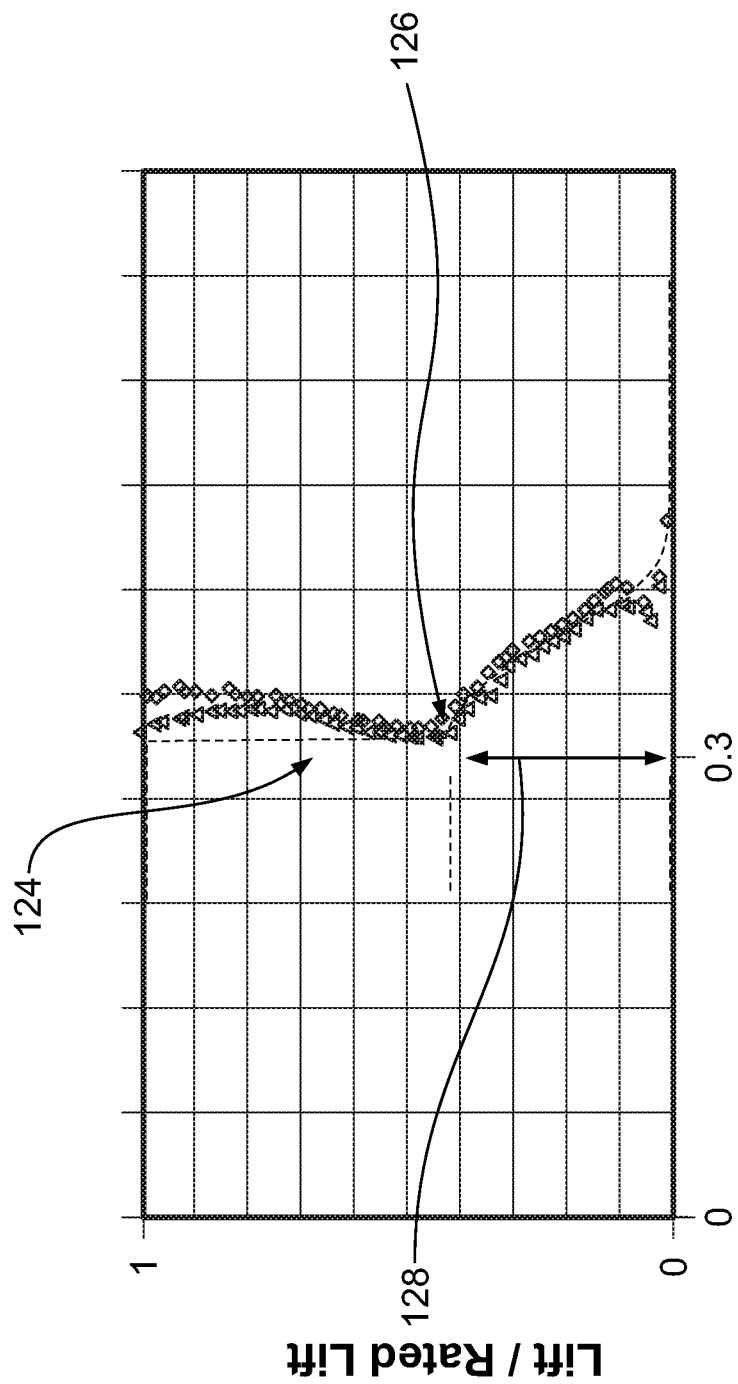
FIG. 9 is a graph of measured pressure factors and lift factors, and an associated correlation for a valve assembly according to an embodiment of the invention.

In some embodiments, the data resulting from the calibration operation may yield a correlation between the pressure factor and the lift factor that is predictable only for a particular range of values. Another example is shown in FIG. 9, which illustrates calibration data collected from a low-pressure relief valve assembly as described above. As shown, when the relevant valve lift factor (here, the ratio of run-time valve lift to rated lift) is above approximately 0.5, the corresponding dome reduction is not usefully correlated to the valve lift factor. Thus, a modified correlation 124 can usefully include a designated step change 126 that sets the valve lift factor to a specified value when the valve lift factor is outside of a predictable range 128. As illustrated, for example, the data corresponding to valve lift factor of above 0.5 would be removed from a measured calibration data set so that a modified correlation 124 can be calculated based only on the data within the predictable range 128. Further, as shown in FIG. 9, the modified correlation 124 then includes a step change 126 up to 1 for any valve lift factor above 0.5.

Still referring to FIG. 9, for example, a pressure factor can be determined from run-time pressure data that are measured by a pressure detection assembly, including as previously described. In particular, for the illustrated example, run-time pressure measurements can be used to calculate a run-time dome reduction ratio. Subsequently, the modified correlation 124 can be used to calculate a run-time valve lift factor based on the determined pressure factor (i.e., the dome reduction). In this regard, when the run-time pressure factor falls within the range of pressure factor values corresponding to a valve lift factor within the predictable range 128, the modified correlation 124 will provide a valve lift factor value based on data from the calibration operation that fell within the predictable range 128. On the other hand, if the run-time pressure falls outside of the range of pressure factor values corresponding to a valve lift factor within the predictable range 128 (e.g. when the pressure factor decreases below 0.3 as shown in FIG. 9), the modified correlation 124 would provide that the valve lift factor undergoes a step change up to 1. Similarly, the valve lift factor would undergo a step change from 1 down to the top of the predictable range 128 when the pressure factor increases again above 0.3.

Although FIG. 9 illustrates one example of a modified correlation based on a predictable range that spans a particular set of valve lift values, a predictable range may span a variety of other ranges of values depending on the application. Further, in some instances, relevant correlations can implement a step change to a constant value for the run-time valve lift factor (or other relevant factor) that may be less than a maximum value for the factor (e.g., less than 1, as in FIG. 9), depending on the valve lift factor being measured or calculated. For example, the endpoints of step changes may change if the relevant valve lift factor is the displacement of the main valve piston with respect to the main valve seat, the ratio of actual valve lift to rated valve lift, etc. The particular contours of a predictable range may also vary, as they may be caused by, or depend from, the characteristics of the relevant pilot-operated relief valve assembly, the properties of the relevant fluid that is regulated by the relief valve assembly, the interaction of the relief valve assembly with other flow control components in the system being regulated, or other parameters.

Additionally, although setting a lift factor (or other calculated factor) to a constant maximum value outside of a predictable range can be convenient and can also generally reflect actual valve operation, other approaches are also possible. For example, rather than implement a step change outside of a predictable range for a pressure-based correlation, some approaches can implement a linear or other correlative approximation, or (as noted above) can implement a step (or other) change to a constant value that is not equal to a particular maximum.

Thus, embodiments of the disclosed invention can provide an improvement over conventional pilot-operated relief valve assemblies. For example, some embodiments provide a pilot-operated relief valve, and a control system including a pressure detection assembly configured to determine at least one of a pressure differential between a valve inlet and a dome, a dome pressure within the dome, or an inlet pressure within the valve inlet. Some embodiments provide a controller with one or more processor devices configured to determine, based upon the pressure detection assembly measurements, a pressure factor. The pressure factor can then be used to calculate a lift factor, which can be used for determining the flow capacity of a relief valve.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A pilot-operated relief valve assembly comprising:
a relief valve assembly that includes:
   a pilot valve; and
   a main valve that includes:
      a dome in fluid communication with the pilot valve;
      a valve inlet in fluid communication with the pilot valve; and
      a valve outlet;
      the main valve being configured to permit or prevent flow from the valve inlet to the valve outlet based on a pressure differential between an inlet pressure at the valve inlet and a dome pressure within the dome;
a pressure detection assembly configured to determine a run-time pressure differential between the valve inlet and the dome; and
a control system configured to communicate with one or more processor devices to:
   determine a run-time pressure factor based on the run-time pressure differential; and
   determine a run-time valve lift factor based upon the run-time pressure factor, without directly measuring a run-time valve lift of the main valve.

2. The pilot-operated relief valve assembly of claim 1, wherein the run-time pressure factor is a run-time dome reduction calculated as a run-time ratio of dome pressure to inlet pressure; and
   wherein the run-time valve lift factor is a ratio of actual valve lift to rated valve lift.

3. The pilot-operated relief valve assembly of claim 1, wherein, over a predetermined range for the run-time pressure factor, the control system is configured to determine the run-time valve lift factor based on a predetermined linear correlation between the run-time pressure factor and the run-time valve lift factor.

4. The pilot-operated relief valve assembly of claim 1, wherein the pressure detection assembly includes only a single pressure sensor that is configured to measure only the run-time pressure differential.

5. The pilot-operated relief valve assembly of claim 4, wherein the control system is configured to communicate with the one or more processor devices to calculate the run-time dome pressure, and thereby the run-time pressure factor, based upon:
   the measured run-time pressure differential; and
   a predetermined correlation between the inlet pressure and one or more of the dome pressure or the pressure differential.

6. The pilot-operated relief valve assembly of claim 1, wherein the control system is configured to communicate with the one or more processor devices to:
   determine a plurality of run-time pressure factors over a time interval;
   determine a plurality of corresponding run-time valve lift factors based upon the run-time pressure factors; and
   determine, based upon the plurality of run-time valve lift factors, a total fluid flow through the main valve over the time interval.

7. A method of monitoring a pilot-operated relief valve assembly that includes a pressure detection assembly, a pilot valve, and a main valve that includes a dome in fluid communication with the pilot valve, a valve inlet in fluid communication with the pilot valve, a valve outlet, and a piston that is configured to permit flow from the valve inlet to the valve outlet in response to a difference between an inlet pressure at the valve inlet and a dome pressure within the dome, the method comprising:
   determining, based on one or more measurements by the pressure detection assembly, at least one of: a run-time dome pressure at the dome, a run-time inlet pressure at the valve inlet, or a run-time pressure differential between the valve inlet and the dome; and
   determining a run-time pressure factor based on the determined at least one of the run-time dome pressure, the run-time inlet pressure, or the run-time pressure differential; and
   without measuring run-time displacement of the piston, determining a run-time valve flow factor for the main valve based upon one or more of:
      correlating the run-time pressure factor directly to the run-time valve flow factor; or
      determining a run-time valve lift factor based upon the run-time pressure factor, and determining the run-time valve flow factor based on the run-time valve lift factor.

8. The method of claim 7, wherein the run-time pressure factor is a run-time dome reduction corresponding to a run-time ratio of dome pressure to inlet pressure.

9. The method of claim 8, wherein the run-time valve lift factor includes a ratio of run-time valve lift to rated valve lift.

10. The method of claim 7, further comprising:
    determining, based upon repeatedly determined values for the run-time valve flow factor over a time interval, a total fluid flow through the main valve over the time interval.

11. The method of claim 7, wherein the pressure detection assembly is configured to measure only the run-time pressure differential.

12. The method of claim 11, wherein determining the run-time pressure factor includes:
    determining the run-time pressure differential based upon measurements by the pressure detection assembly; and
    calculating the run-time dome pressure based upon the run-time pressure differential.

13. A control system for a pilot-operated relief valve assembly, the pilot-operated relief valve assembly including:
a relief valve assembly that includes:
   a pilot valve; and
   a main valve that includes:
      a dome in fluid communication with the pilot valve;
      a valve inlet in fluid communication with the pilot valve;
      a valve outlet; and
      a piston movable between a fully open position and a fully closed position, the piston being caused to move between the fully open and fully closed positions by a pressure differential between the dome and the valve outlet;
      the main valve being configured to permit flow from the valve inlet to the valve outlet in response to an inlet pressure at the valve inlet, depending on a position of the piston; and
one or more pressure sensors that are configured to determine at least one of: a run-time dome pressure within the dome, a run-time inlet pressure, or a run-time pressure differential between the valve inlet and the dome;

the control system comprising one or more processor devices that are configured to:

determine a run-time pressure factor at a run-time valve lift of the main valve, based on the determined at least one of the run-time dome pressure, the run-time inlet pressure, or the run-time pressure differential; and based upon the run-time pressure factor and without receiving a measurement of the run-time valve lift, determine a run-time valve flow factor at the run-time valve lift, wherein the run-time valve flow factor corresponds to run-time flow from the valve inlet to the valve outlet of the main valve.

14. The control system of claim 13, wherein the run-time valve flow factor is a run-time discharge coefficient; and wherein the one or more processor devices are configured to calculate a run-time discharge coefficient at the run-time valve lift, based upon one or more of:

correlating the run-time pressure factor directly to the run-time discharge coefficient, or determining a run-time valve lift factor based upon the run-time pressure factor, and correlating the run-time valve lift factor to the run-time discharge coefficient.

15. The control system of claim 14, wherein the one or more processor devices are further configured to:

calculate multiple run-time discharge coefficients over a time interval; and determine a magnitude of flow during a relief event for the relief valve assembly based on the multiple run-time discharge coefficients.

16. The control system of claim 13, wherein, when the run-time pressure factor falls within a predetermined range, the run-time valve flow factor is determined based on a correlation between the run-time valve flow factor and the run-time pressure factor; and wherein, when the run-time pressure factor falls outside the predetermined range, the run-time valve flow factor is set to a predetermined constant value.

17. The control system of claim 16, wherein the predetermined constant value corresponds to a maximum flow capacity of the main valve.

18. The control system of claim 13, wherein the run-time valve flow factor is determined without reference to whether the main valve is opening or closing.

19. The control system of claim 13, wherein the run-time valve flow factor is separately determined as an opening flow factor and a closing flow factor, depending on whether the main valve is opening or closing, respectively;

wherein the opening and closing flow factors are determined based on different respective relationships with the run-time pressure factor; and wherein a magnitude of flow during a relief event for the relief valve assembly is determined based on the opening flow factor and on the closing flow factor.

20. A method for monitoring a pilot-operated relief valve assembly that includes a pressure detection assembly, a pilot valve, and a main valve that includes a dome in fluid communication with the pilot valve, a valve inlet in fluid communication with the pilot valve, a valve outlet, and a piston that is configured to permit flow from the valve inlet to the valve outlet in response to a difference between an inlet pressure at the valve inlet and a dome pressure within the dome, the method comprising:

providing a relationship for a run-time valve flow factor for the main valve, wherein, without a measurement of run-time displacement of the piston, the relationship is configured to control a processor device to one or more of:

correlate a run-time pressure factor directly to the run-time valve flow factor; or correlate a run-time valve lift factor to the run-time valve flow factor, wherein the run-time valve lift factor is determined based upon the run-time pressure factor;

wherein the run-time pressure factor is configured to be determined based on at least one of: a run-time dome pressure at the dome, a run-time inlet pressure at the valve inlet, or a run-time pressure differential between the valve inlet and the dome, each of which is configured to be determined based on one or more measurements by the pressure detection assembly.

\* \* \* \* \*